US008491707B2

(12) United States Patent
Knuth

(10) Patent No.: US 8,491,707 B2
(45) Date of Patent: Jul. 23, 2013

(54) FLUID STORAGE TANK CONFIGURED TO REMOVE ENTRAINED AIR FROM FLUID

(75) Inventor: Bruce E. Knuth, Oconomowoc, WI (US)

(73) Assignee: Helgesen Design Services, LLC, Hartford, WI (US)

( * ) Notice: Subject to any disclaimer, the term of this patent is extended or adjusted under 35 U.S.C. 154(b) by 268 days.

(21) Appl. No.: 13/113,661

(22) Filed: May 23, 2011

(65) Prior Publication Data

US 2011/0284089 A1 Nov. 24, 2011

Related U.S. Application Data

(60) Provisional application No. 61/347,678, filed on May 24, 2010.

(51) Int. Cl.
*B01D 45/00* (2006.01)

(52) U.S. Cl.
USPC .................. 95/267; 96/155; 96/204; 96/215; 96/189; 96/220; 137/1; 137/574; 137/544; 220/501; 60/453

(58) Field of Classification Search
USPC ... 96/155, 204, 215, 189, 220; 95/267; 137/1, 137/574, 544; 60/453
See application file for complete search history.

(56) References Cited

FOREIGN PATENT DOCUMENTS

| | | | |
|---|---|---|---|
| JP | 05-321902 | A | 12/1993 |
| JP | 2004-011873 | A | 1/2004 |
| JP | 2004-084923 | A | 3/2004 |
| KR | 10-2008-0068591 | A | 7/2008 |

*Primary Examiner* — Jason M Greene
*Assistant Examiner* — Dung H Bui
(74) *Attorney, Agent, or Firm* — Reinhart Boerner Van Deuren P.C.

(57) ABSTRACT

A fluid storage tank including an entrained air removal mechanism is provided. The entrained air removal mechanism assists in consolidating small air bubbles entrained within the fluid into larger bubbles such that the air bubbles have sufficient buoyancy to escape the fluid flow. The entrained air removal mechanism may be in the form of a plurality of saw toothed slots communicating different chambers within the fluid storage tank. The fluid storage tank can also be configured to direct fluid flow towards the sidewalls of the fluid storage tank as the fluid transitions from one chamber to another to promote heat transfer out of the fluid storage tank and to avoid the fluid within the tank acting as a thermal insulator.

25 Claims, 6 Drawing Sheets

FLUID STORAGE TANK CONFIGURED TO REMOVE ENTRAINED AIR FROM FLUID

CROSS-REFERENCE TO RELATED PATENT APPLICATIONS

This patent application claims the benefit of U.S. Provisional Patent Application No. 61/347,678, filed May 24, 2010, the entire teachings and disclosure of which are incorporated herein by reference thereto.

FIELD OF THE INVENTION

This invention generally relates to fluid storage tanks and more particularly to fluid storage tanks that remove entrained air and heat from the fluid stored therein.

BACKGROUND OF THE INVENTION

Many devices use fluid as a means to power other devices. For instance, many devices such as trucks, heavy equipment, construction equipment, farm equipment, etc. will utilize a hydraulic system that uses pressurized hydraulic fluid (typically oil) to run hydraulic motors, drive hydraulic cylinders, etc.

Unfortunately, return hydraulic fluid from a hydraulic system contains entrained air in the form of microscopic bubbles. The source of this air can be a number of locations such as hydraulic cylinder rod seals, hydraulic pump and motor shaft seals and turbulence within the reservoir itself. Traditionally, the means by which to deal with this contamination is to build the reservoir large enough in order to increase the surface contact between hydraulic fluid and air within the tank. The larger amount of surface area and size of the tank allowed entrained air to escape by traveling to the surface of the reservoir, prior to the oil returning to the pump inlets.

Further, as hydraulic fluid is cycled through a system, the fluid will take on heat energy. Unfortunately, larger tank sizes are typically required to extract this excess heat.

The present invention relates to improvements in the prior art.

BRIEF SUMMARY OF THE INVENTION

Embodiments of the present invention relate to new and improved fluid storage tanks. More particularly, embodiments of the present invention relates to new and improved fluid storage tanks for removing entrained air from fluid stored within and passing through the fluid storage tank. Even more particularly, embodiments of the present invention relate to new and improved fluid storage tanks for removing entrained air from fluid stored therein that utilizes devices to promote nucleation of the entrained air within the fluid to improve removal thereof.

In one embodiment a fluid storage tank having improved air extraction capabilities is provided. The fluid storage tank includes a nucleation plate having nucleation slots formed therein which cause small entrained air bubbles to nucleate or otherwise agglomerate into larger bubbles that have sufficient buoyancy to overcome the flow forces acting on the air bubbles.

In a more preferred embodiment, the nucleation slots are saw-toothed slots having a plurality of peaks and valleys that increase the nucleation surfaces of the nucleation slots to promote consolidation of the microscopic air bubbles into larger bubbles.

In a more preferred embodiment, the surfaces of the saw toothed slots have a surface roughness of between about 40 and 70 Ra so as to further promote trapping the microscopic air bubbles on the surface of the nucleation slots.

In one embodiment, the nucleation surfaces are preferably angled downward relative to the top surface of the fluid within the fluid storage tank when traveling in the downstream direction. This directs the fluid flow away from the surface of the tank to inhibit turbulence production at the fluid surface of the tank to inhibit further air entrainment. Further, the nucleation plate including these nucleation slots is preferably angled relative to the top surface of the fluid. This angle is preferably between about 30 and 60 degrees and more preferably between about 40 and 50 degrees. This angle also causes the fluid bubbles formed on the top surface of the nucleation slots to be pressed into the top surface rather than pressed off of the surfaces such that it is more difficult to discharge the consolidating bubbles from the nucleation surfaces allowing increased bubble size formation. However, other embodiments may have a surface roughness of less than 135 Ra.

In other embodiments, the nucleation surfaces may be angled upward relative to the top surface of fluid. This arrangement reduces fluid flow resistance (i.e. back pressure) allowing the fluid to flow through the slots at a slower rate. These arrangements typically have an angle of between about 120 to 150 degrees and more preferably 130 to 140 degrees and preferably about 135 degrees.

Directing the fluid flow towards the top surface of the fluid also promotes bubble formation. It has been found that bubbles form at a greater rate at higher locations within the fluid flow. This is believed to be due to the reduced pressure closer to the surface of the fluid preventing bubble formation. Thus, by directing fluid towards the top of the surface, bubble formation can be promoted, for these reasons.

However, this angle may change due to the flow rate of fluid through the fluid storage tank and the physical properties of the fluid. As such, the applicant reserves the rights to claim any particular range or individual value of angle $\alpha$ between the 30 to 60 and 120 to 150 degrees.

In a further embodiment, the height of the slots, i.e. perpendicular to the flow through the slots, is between about 1/16 and 1/2 inch. More preferably, the height is about 1/8 of an inch. This height can be measured at the peaks or the valleys of the saw tooth surfaces.

In a further embodiment, the fluid storage tank includes at least an inlet zone and an air-extraction zone. The inlet zone is immediately upstream of the nucleation slots and the air-extraction zone is immediately downstream of the nucleation slots. The top of the inlet zone is vertically lower than the top of the air-extraction zone. Further, in operation, the hydraulic fluid level is maintained at a depth that is higher than the top of the inlet zone at all times. This prevents an air-hydraulic fluid interface within the inlet zone reducing the amount of air entrainment due to turbulence generated by the hydraulic fluid as it enters the inlet zone.

A further embodiment includes a redirection zone immediately downstream of the air-extraction zone. This zone causes the fluid to be redirected from its flow direction within the air-extraction zone. This redirection allows the enlarged bubbles to be expelled from the fluid flow. Similarly, in one embodiment, the fluid storage tank includes an outlet zone downstream of the redirection zone. Again, the fluid flow is redirected as it exits the redirection zone into the outlet zone. Preferably, the redirections into and out of the redirection zone result in a change in direction of between about 150-180 degrees.

The devices (i.e. metal plates) that separate the various portions of the fluid storage tank into the various different zones, are preferably thermally connected to the wrapper of the fluid storage tank so as to promote further heat transfer to the wrapper for subsequent heat dissipation (welding). As such, these additional structures function as heat sinks.

In a further embodiment, the nucleation slots are formed at the sides of the tank and not at the center of the nucleation plate. This causes the fluid to be directed laterally outward toward the sides of the fluid storage tank to promote heat transfer to the wrapper, i.e. housing, of the tank so as to improve heat extraction from the tank. As such, in one embodiment, a continuous portion of the nucleation plate is in the center of the plate forcing fluid flow laterally towards the sides. Further, in one embodiment, the nucleation slots do not extend across the center of the nucleation plate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
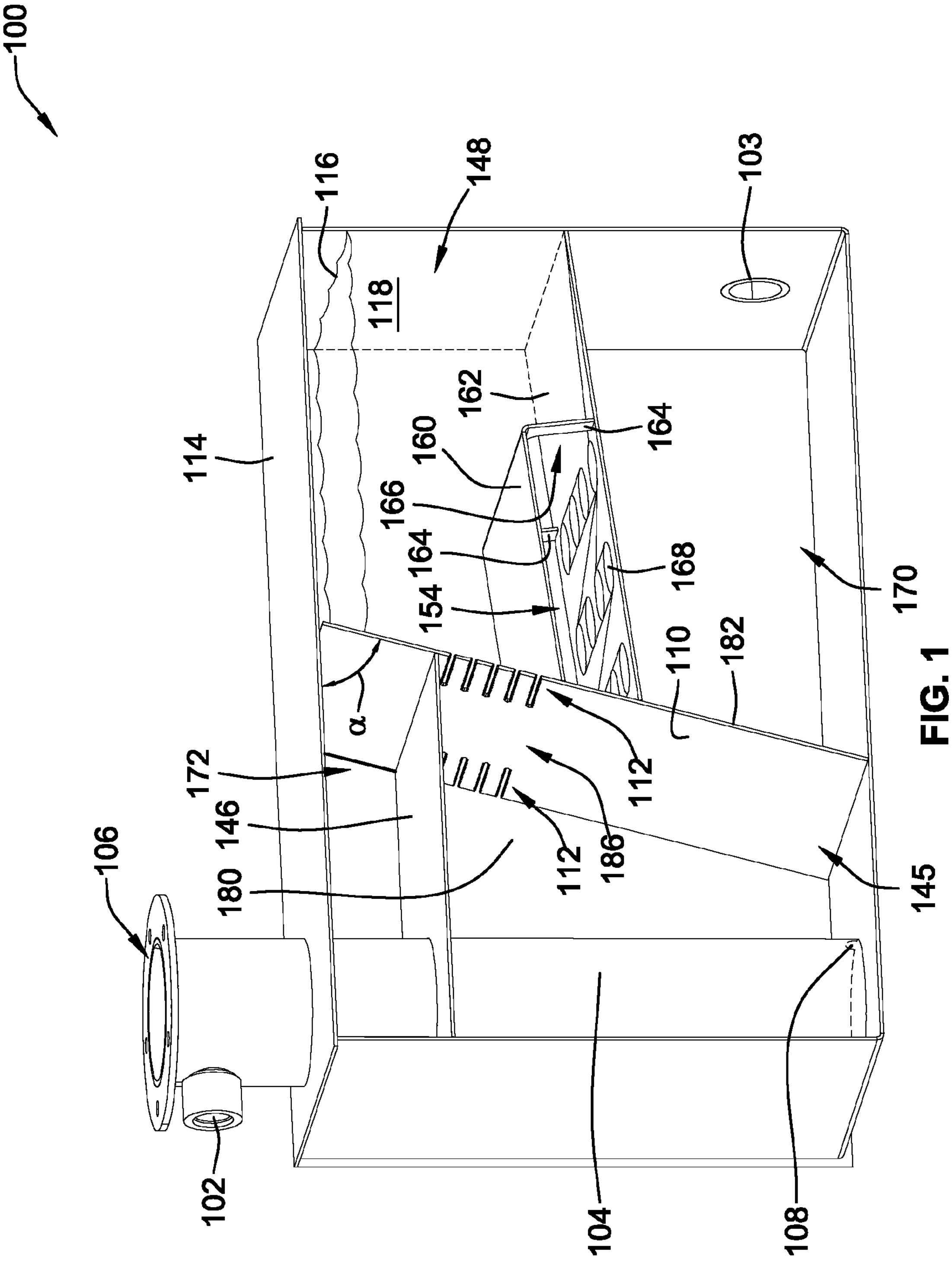
FIG. 1 is a perspective partial illustration of fluid storage tank according to an embodiment of the present invention with one side removed showing the internal components thereof.

FIG. 1 is a perspective illustration of a fluid storage tank 100 according to an embodiment of the present invention. The fluid storage tank 100 is used to store fluid for use in a down stream system (not shown). In one embodiment, the system is a hydraulic system that uses the fluid as a means for transmitting power to or from devices of the system, such as hydraulic motors, pumps, cylinders, etc.

The fluid storage tank 100 includes a fluid inlet 102 where return fluid that has passed through the system returns to the fluid storage tank 100. The inlet 102 may be in the form of a threaded coupling, a quick connect coupling, or other coupling to which a fluid conduit or hose may be connected. The fluid storage tank 100 also includes an outlet 103 through which the stored fluid exits the fluid storage tank 100. This outlet 103 can be similar to the inlet 102. Typically, the outlet 103 is coupled to a source of suction such as a hydraulic pump.

In this particular embodiment, the fluid storage tank 100 includes a filter housing 104 in which a fluid filter can be stored for filtering the return fluid before it is mixed with the rest of the fluid stored in the storage tank 100. The filter housing 104 has a filter opening through which the filter can be removed or inserted during maintenance intervals. The filter housing 104 has an outlet 108 proximate to the bottom of the fluid storage tank 100 from which the filtered fluid exits the filter housing 104.

The fluid storage tank 100 of this embodiment has a wrapper (or outer shell) that has generally rectangular sides; however, other shapes can be used.

The fluid storage tank 100 is configured to remove entrained air from within the hydraulic fluid flowing through the fluid storage tank 100 as well as to promote extraction of heat from the fluid storage tank 100. As such, a smaller fluid storage tank incorporating the features of the present invention can be used while still allowing for proper extraction of air and heat.

To remove air, the fluid storage tank 100 includes a nucleation plate 110 (also referred to as a bubble forming plate) configured to cause the small microscopic air bubbles entrained within the hydraulic fluid to consolidate and form larger air bubbles. The larger bubbles increase the buoyancy forces on an individual air bubble allowing the bubbles to overcome the fluid flow forces acting on the bubbles as the hydraulic fluid flows through the fluid storage tank 100.

It has been found that fluid storage tanks including a nucleation system according to the teachings of embodiments of the present invention for nucleating the microscopic air bubbles can remove up to 33% more entrained air than a fluid storage tank of comparable size absent such a nucleation system.

As shown in FIG. 1, the nucleation plate 110 includes a plurality of nucleation slots 112 (also referred to as "formation slots"). The nucleation slots 112 are configured to cause the microscopic air bubbles entrained within the hydraulic fluid to stick to the surfaces of the slots 112. As more and more air sticks to the surfaces of the slots 112, the individual bubbles will consolidate into larger bubbles. Once they are knocked off of the nucleation plate 110, due to the flow of fluid, the bubbles are large enough to over come the flow forces generated by the flow of fluid through the fluid storage tank.

The nucleation plate 110 is angled relative to the top 114 of the fluid storage tank 100 and consequently the top surface 116 of the hydraulic fluid 118 by angle $\alpha$ of between about 30 and 60 degrees and more preferably between about 40 and 50 degrees and preferably about 45 degrees. However, this angle may change due to the flow rate of fluid through the fluid storage tank 100 and the physical properties of the fluid 118. As such, the applicant reserves the rights to claim any particular range or individual value of angle $\alpha$ between the 30 and 60 degree range identified above.

Further, the slope of the nucleation plate 110 is configured such that the fluid flows vertically downward as it passes through the nucleation slots 112. This is done to reduce turbulence at the top surface 116 of the fluid to reduce the likelihood of further air entrainment.

Figure 2:
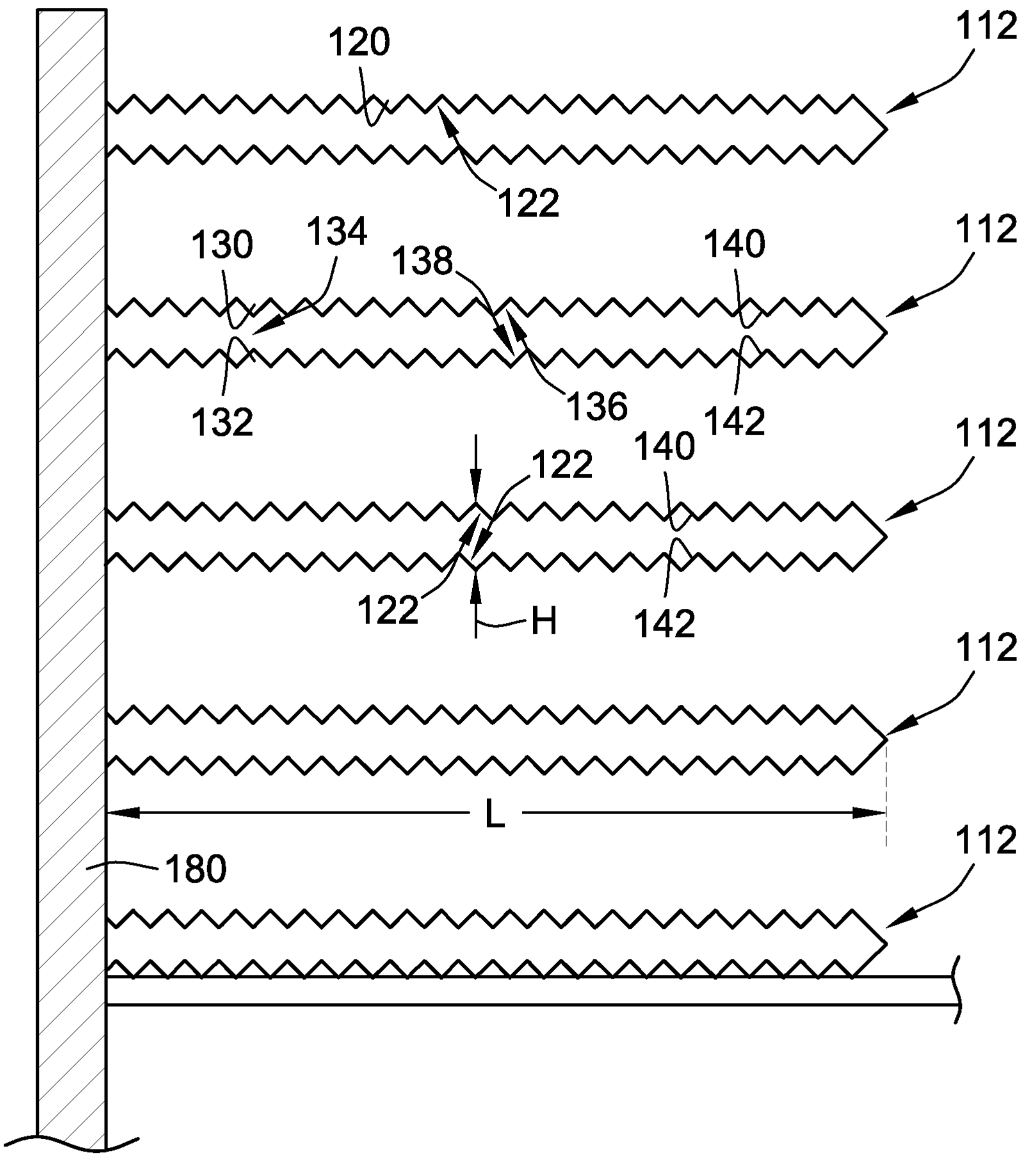
FIG. 2 is an enlarged plan view of a bank of nucleation slots formed in a nucleation plate of the fluid storage tank of FIG. 1.

With reference to FIG. 2, to promote attachment of the microscopic air bubbles to the surfaces of the nucleation slots 112, the slots 112 are generally serrated: formed by a plurality of alternating peaks and valleys, referred to generically with reference numerals 120, 122, respectively. However, specific peaks or valleys may have particular reference numerals.

In one embodiment, the upper peaks laterally align with lower peaks, such as illustrated by peaks 130, 132. In this arrangement, the tips of the peaks 130 form a necked down region 134, therebetween. Similarly, the upper valleys align with lower valleys, such as illustrated by valleys 136, 138 forming wider gaps thereat. As such the vertical gap H between the upper surface 140 of the slots 112 and the lower surface 142 of the slots 112 alternates between large and small values as one travels laterally inward toward the center of the nucleation plate 110.

Further, the peaks and valleys 120, 122 provide a saw tooth shape to the top and bottom surfaces 140, 142 and maximize the amount of surface upon which the bubble consolidation can occur. As the surface condition of surfaces 140, 142 affects the amount of air that can be trapped or removed from the fluid, a surface roughness of no less than 40 Ra with a preferred surface roughness of between about 60 and 80 Ra and more preferably about 65 and 75 Ra and even more preferably about 70 Ra. The surface roughness promotes the amount of the microscopic bubbles that will be become trapped on the surfaces of the slots 112. However in some embodiments the surface roughness can be up to 130 Ra. This increases the growth of the bubble size and increases the buoyancy of the individual bubbles once the bubbles detach from the nucleation plate 110 and reenter the fluid flow through the fluid storage tank 100. The increase bubble size makes it easier for the bubbles to overcome the fluid flow forces and float to the top of the hydraulic fluid and be removed from the hydraulic fluid.

Figure 3:
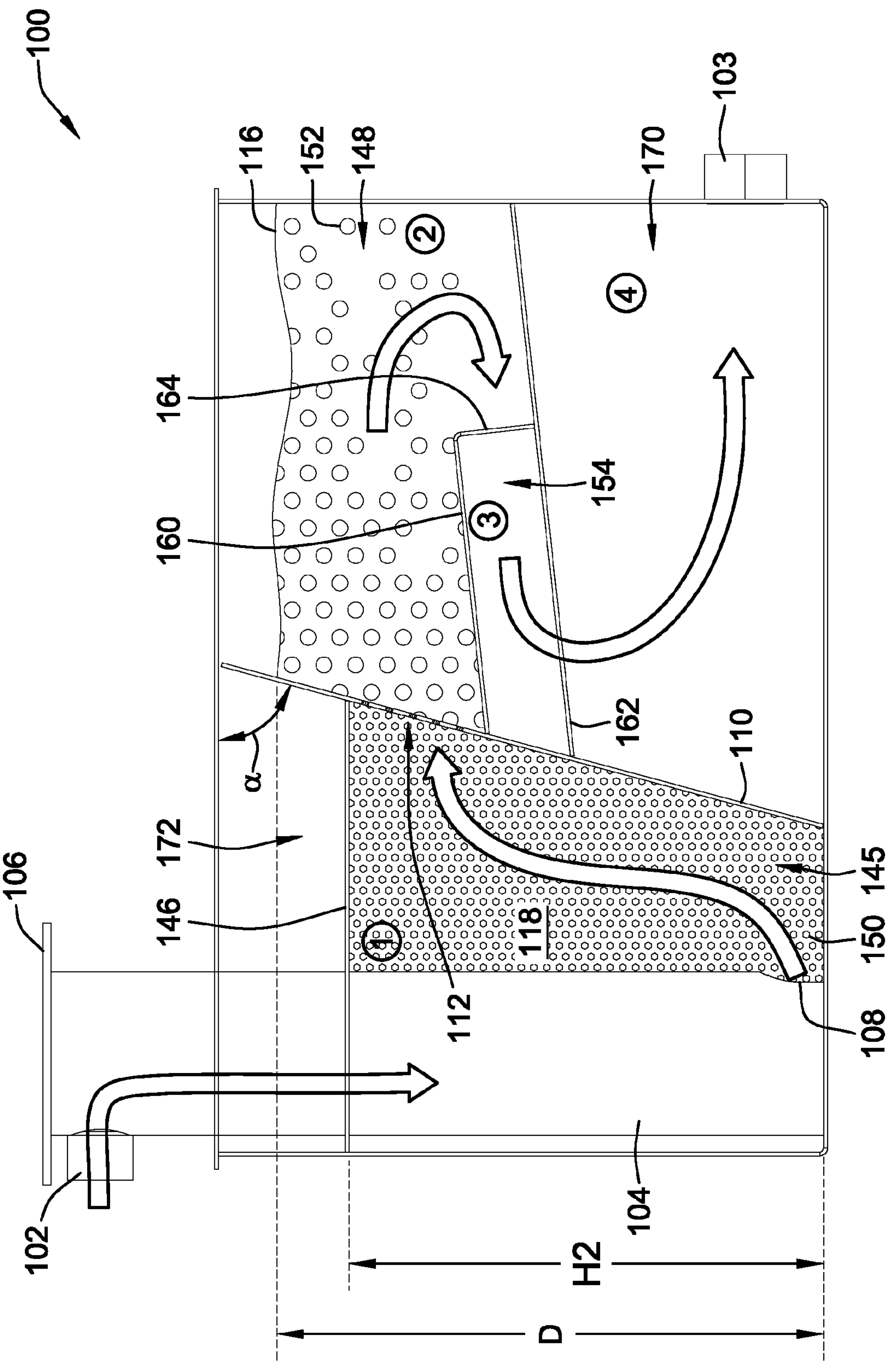
FIG. 3 is a side cross-sectional illustration of the storage tank of FIG. 1 schematically illustrating bubble formation and extraction from the tank.
Figure 4:
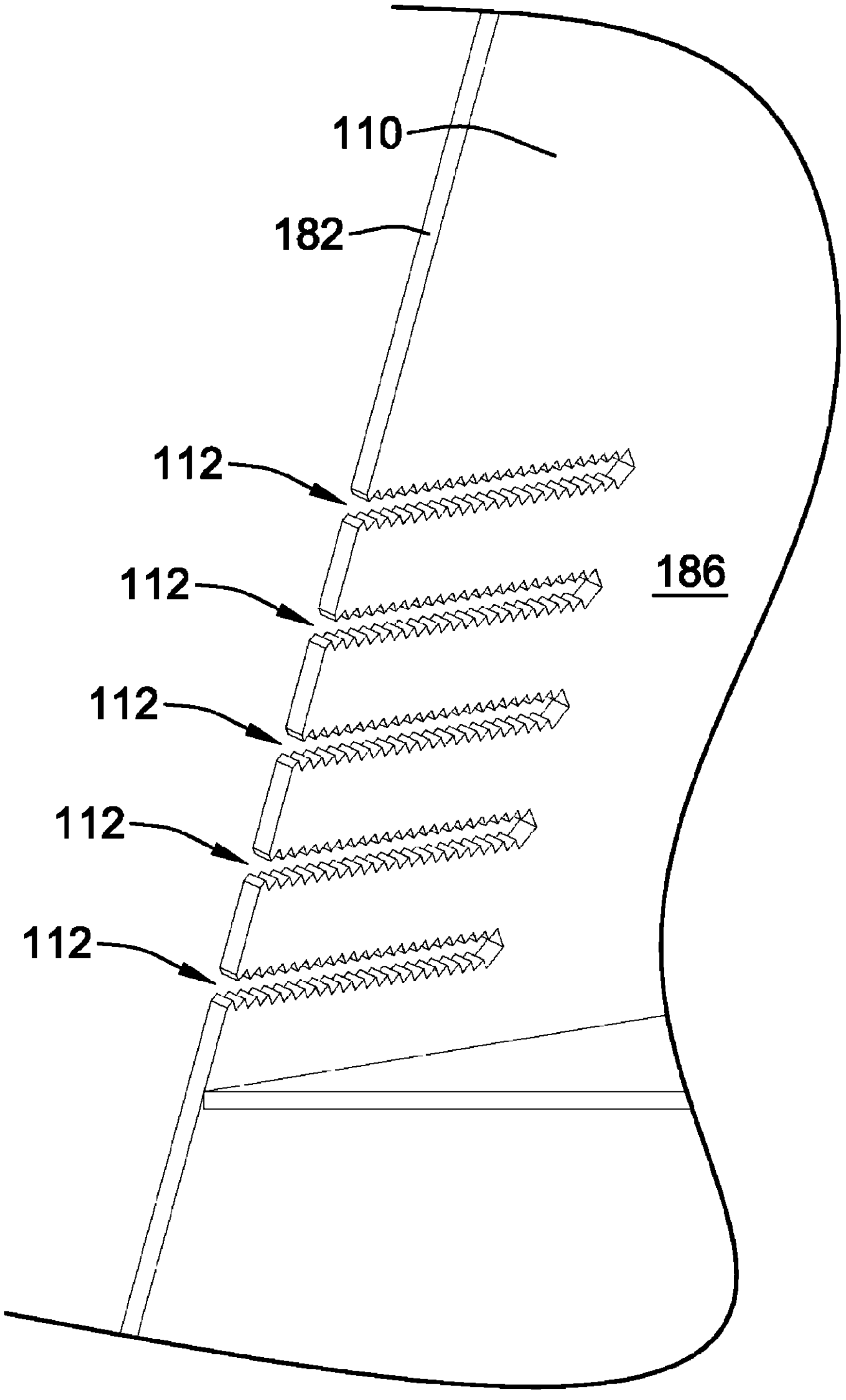
FIGS. 4 and 5 are perspective illustrations of the nucleation slots.
Figure 5:
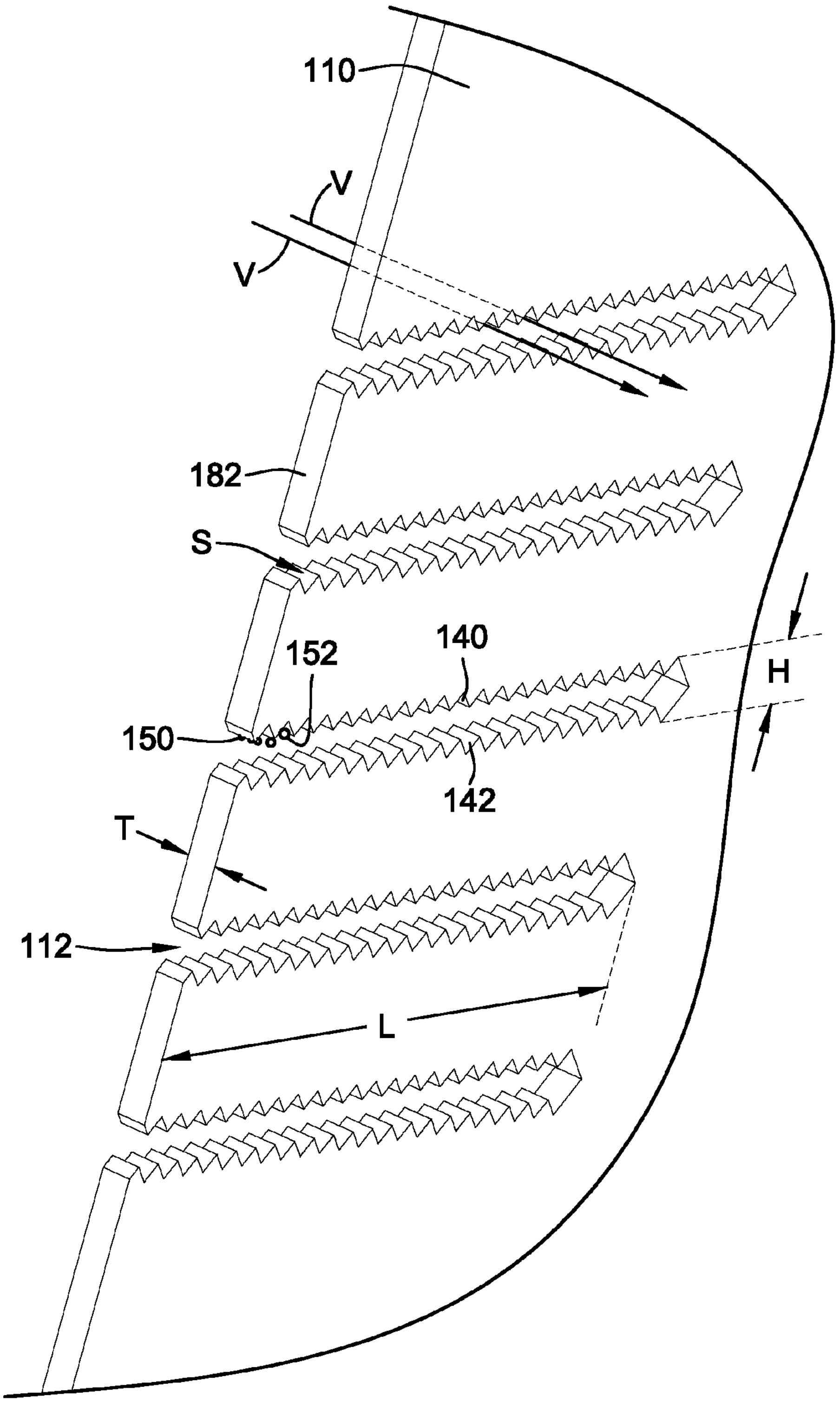

FIG. 3 is a schematic representation of the fluid flow through storage tank 100 and the not-to-scale size of the air bubbles within the hydraulic fluid 118 as it flows through the fluid storage tank 100.

As a preliminary note, the fluid storage tank 100 is divided into four (4) different zones. The first zone (1) is an inlet zone (also referred to as "inlet chamber 145") in which the raw return fluid enters the fluid storage tank 100. This zone is bounded generally by a portion of the outer housing of the storage tank 100, the nucleation plate 110 and an anti-turbulence top plate 146. In FIG. 3, it can be seen that the depth D of the fluid is greater than the height H2 of the top plate 146. As such, there is not an air pocket between the fluid 118 and the top plate 146 within inlet chamber 145.

This is because as the return fluid enters the inlet chamber 145, the fluid is flowing at a fast pace. As the fluid flows vertically upward, if the fluid were in direct contact with an air pocket, the turbulence at the top surface of the fluid would promote entraining more air into the hydraulic fluid 118. However, by eliminating the air pocket in this portion of the fluid storage tank 100, a turbulent air-fluid interface is eliminated. This arrangement also keeps all nucleation slots 112 submerged in hydraulic fluid to promote the nucleation process. More particularly, the slots 112 will remain submerged even during fluctuations in tank fluid level (i.e. depth D in FIG. 3).

The fluid storage tank has a second zone (2), which is also referred to an air-extraction chamber 148 in which the majority of the air bubbles are extracted from the hydraulic fluid. The air-extraction chamber 148 is on the opposite side of the nucleation plate 110 as the inlet chamber 145. Thus, as illustrated in FIG. 3, the microscopic air bubbles 150 within fluid 118 in the inlet chamber 145 are significantly smaller than the nucleated bubbles 152 within air-extraction chamber 148. These bubbles 152 have broken free from the nucleation slots 112 (which may also be referred to as "formation slots") and are overcoming the fluid flow forces within the air-extraction chamber 148 such that the larger air bubbles 152 can escape the fluid flow and float to the surface 116 of the fluid 118.

The third zone (3) may be referred to as redirection zone 154 which causes the fluid flow to change directions twice. By changing the fluid flow directions, this promotes discharging the entrained larger air bubbles 152 from the hydraulic fluid. At this point, the fluid flow is fully conditioned fluid that has had entrained air removed therefrom. As fluid transitions from the second zone to the third zone, a first, approximately, 180 degree change in direction is generated. When the flow transitions from the third zone to the fourth zone, a second, approximately, 180 degree change in direction is generated.

In the illustrated embodiment, the redirection zone 154 is formed between two generally parallel plates 160, 162. The plates 160, 162 abut a continuous portion of the nucleation plate 110. The opposite end of the upper plate 160 is supported by a pair of legs 164 to form an inlet opening 166. A plurality of openings 168 formed in lower plate 168 permit the fully conditioned fluid to transition into an outlet chamber 170, i.e. the fourth zone.

Due to the inclusion of top plate 146, a fifth zone or dead zone 172 may be considered to be within fluid storage tank 100. This zone may be sealed off from the rest of the tank 100. Alternatively, top plate 146 may include slots such that fluid is permitted to flow into that zone such as during expansion of the fluid level within the fluid storage tank 100.

In some instances, systems according to the present invention can increase air extraction by up to 33% over tanks of a similar size without such a nucleation arrangement.

The slots 112 are generally aligned horizontally in the illustrated embodiment. This causes the top surface 140 (see FIG. 2) of the slots to be angled downward when traveling in the downstream direction. This causes the fluid flow to be pressed into this top surface increasing the formation of larger bubbles. This promotes increased air extraction from the fluid. The angle of the surfaces 140, 142 corresponds to angle $\alpha$. However, as noted above, the surfaces may preferably extend vertically downward in the direction of fluid flow.

In general, it is preferred to have the sum of the open area of the nucleation slots 112 to be equal or greater than the smallest cross-sectional area of the flow path through the reservoir in order to avoid introducing back pressure on upstream flow due to the nucleation slots 112. Further, the length L, height H and number of slots 112 is desired to be such that the flow velocity, V, through the slot area has a minimum of between about 0.3 and 0.5 ft/sec and a maximum of between about 6 and 9 ft/sec. The thickness, T, of the nucleation plate 110 (and consequently the length of the top and bottom surfaces 140 and 142 parallel to the flow of fluid therethrough) is preferably greater than 3 mm and no greater than 10 mm and preferably no greater than 8 mm for the above identified flow velocity range. Thicker materials may cause localized turbulence causing the forming bubbles to prematurely be discharged from the surfaces before they have grown to a desired size. As such, the discharged bubbles will not have adequate buoyancy to overcome the flow forces. As such, these bubbles will remain in the fluid flow and pass through outlet 103.

Because more air can be extracted from the tank, independent of the amount of air-fluid interface area and volume of the tank, smaller tanks can be used while maintaining the same amount of air removal.

A further feature of the present invention is that the slots 112 are formed at the sides of the nucleation plate 110 such that the slots 112 are positioned adjacent the sidewalls 180 (only one shown in FIG. 1) of the fluid storage tank 100. This arrangement directs the fluid flow exiting outlet 108 to flow laterally towards the sides 180 of the tank 100. This reduces the volume of dead heat transfer spots within the tank 100.

When the inlet (i.e. inlet 102) and outlet 103 are laterally aligned with one another, flow will tend to pass through the center of the tank 100. Some flow offset from the centerline flow between the inlet and outlet will become relatively stagnant. This laterally outer stagnant fluid will create a thermal insulator reducing the heat extraction properties of the tank.

As such, by forcing the fluid to flow laterally outward, i.e. toward the sidewalls 180, these dead spots are reduced. Further, this causes more of the fluid flow to contact the sidewalls 180 promoting convection between the sidewalls 180 and the fluid flow increasing the head extraction properties of the tank 100.

As such, in one embodiment, the slots extend through an edge, i.e. edge 182, of the nucleation plate. The slots 112 are closed off by the sidewalls 180 of the tank 100 such that the slots are bounded in part by the sidewalls 180 and the nucleation plate 110. Further, in the illustrated embodiment, the nucleation plate 110 includes a continuous portion 186 laterally interposed between the slots 112. As such, there are two banks of slots 112 on opposite sides of continuous portion 186. The continuous portion forces fluid flow laterally towards sides 180.

The increased heat extraction also allows for a smaller tank sizes.

Further, the number of slots 112 can be adjusted to change pressure characteristics of the corresponding banks of slots 112 to adjust fluid flow to different sides of the tank 100.

Figure 6:
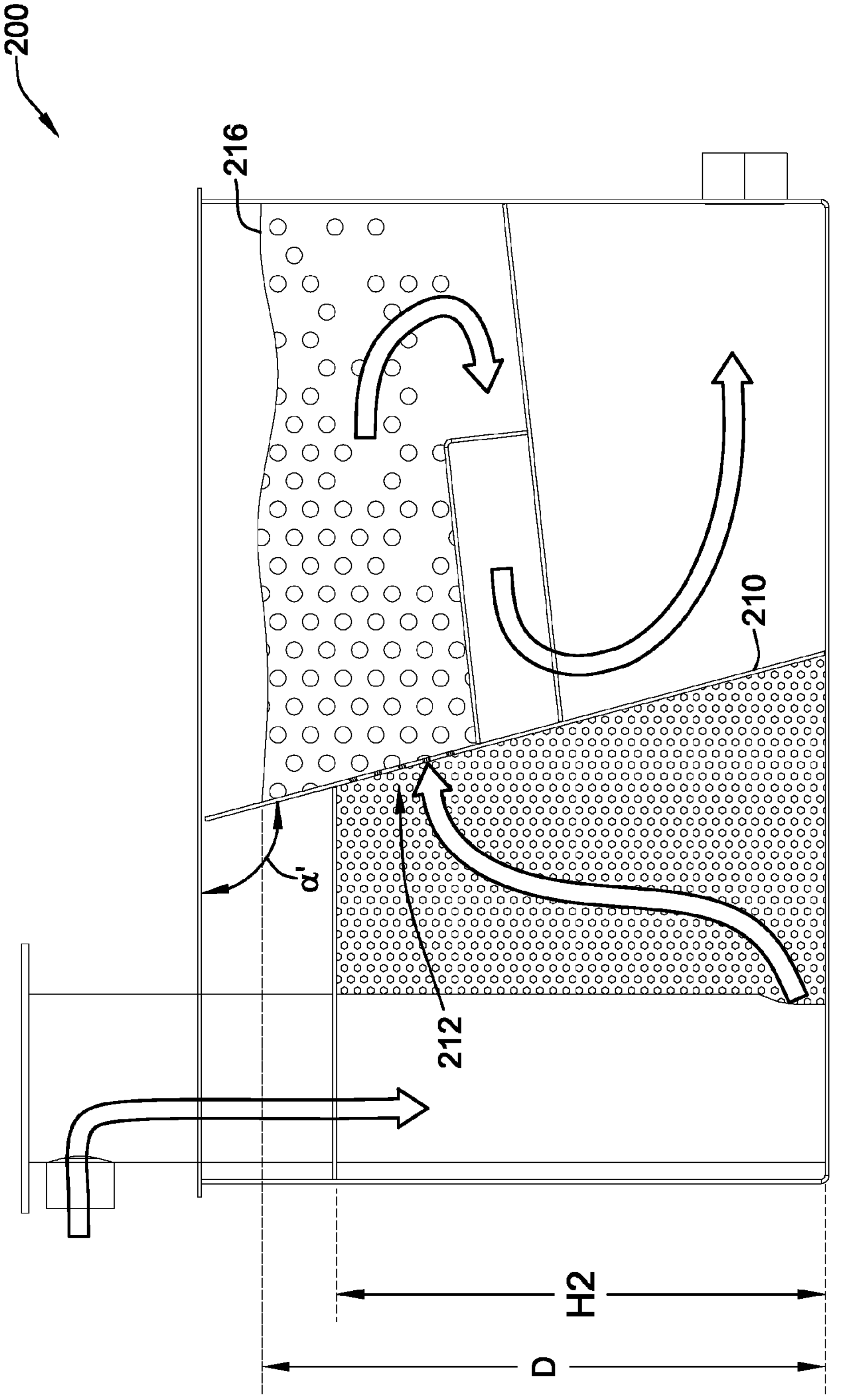
FIG. 6 illustrates an alternative embodiment, similar to that of FIG. 3.

FIG. 6 is a further embodiment of a fluid storage tank 200 similar to that of the prior embodiments. However, in this embodiment, the nucleation plate 210 extends at an angle $\alpha'$ that is greater than 90 degrees in the direction of fluid flow through the nucleation slots 212. This angle $\alpha'$ directs the fluid flow through the nucleation slots 212 toward the top surface 216 of the of the fluid.

This arrangement reduces fluid flow resistance (i.e. back pressure) allowing the fluid to flow through the slots at a slower rate. These arrangements typically have an angle $\alpha'$ of between about 120 to 150 degrees and more preferably 130 to 140 degrees and preferably about 135 degrees relative to top surface 216.

Directing the fluid flow towards the top surface 216 promotes bubble formation. It has been found that bubbles form at a greater rate at higher locations within the fluid flow. This is believed to be due to the reduced pressure closer to the surface 216 fluid promoting bubble formation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid storage tank comprising:

a housing defining an internal cavity, an inlet and an outlet; and an entrained air removal mechanism within the internal cavity fluidly interposed between the inlet and the outlet such that all fluid that passes through the inlet and outlet must pass through the entrained air removal mechanism;

wherein the entrained air removal mechanism is a separation plate within the housing separating the internal cavity into, at least, a first chamber and a second chamber, the plate including a plurality of slots there through that fluidly communicates the first chamber with the second chamber; and wherein the plurality of slots include a plurality of peaks and valleys providing a saw tooth profile on at least one side of the slots.

2. The fluid storage tank of claim 1, wherein the housing has a pair of opposed sidewalls that extend generally between the inlet and the outlet, wherein the slots are bounded on one end by one of the opposed sidewalls.

3. The fluid storage tank of claim 1, wherein the slots are angled vertically downward in the direction of fluid flow through the slots.

4. The fluid storage tank of claim 1, wherein the combined surface area of the slots is at least equal to the surface are of the other openings within the fluid storage tank so as to avoid increased flow resistance on the fluid through the tank due to the slots.

5. The fluid storage tank of claim 1, wherein a top plate of the first chamber is vertically higher than a top plate of the second chamber such that the fluid level within the second chamber can be maintained at a level higher than in the first chamber.

6. The fluid storage tank of claim 1, wherein the surface roughness of the surface of at least one of the sides of the slots is at least 40 Ra.

7. The fluid storage tank of claim 6, wherein the surface roughness of the surface of the at least one of the sides of the slots is no greater than 70 Ra.

8. The fluid storage tank of claim 1, further including third and fourth chambers, the fluid making a first flow redirection as it transitions from the second chamber to the third chamber an a second flow redirection, opposite the first flow redirection, as the flow transitions from the third chamber to the fourth chamber.

9. The fluid storage tank of claim 8, wherein the first and second flow redirections are between about 150 and 180 degrees.

10. The fluid storage tank of claim 1, wherein the slots have a maxim height of between about 1/16 of an inch and ½ an inch.

11. The fluid storage tank of claim 10, wherein the slots have a maximum height of between about ⅛ of an inch and 3/16 of an inch.

12. The fluid storage tank of claim 1, wherein the housing has a pair of opposed sidewalls that extend generally between the inlet and the outlet, the separation plate extends between the opposed sidewalls, wherein the plurality of slots includes a first bank of slots adjacent one of the sidewalls and a second bank of slots adjacent the other one of the sidewalls.

13. The fluid storage tank of claim 12, wherein the first and second banks of slots are separated by a continuous portion of the plate forcing fluid flow towards the opposed sidewalls and not through the center of the plate.

14. The fluid storage tank of claim 13, wherein the slots are bounded on at least one end by the corresponding adjacent one of the sidewalls.

15. The fluid storage tank of claim 1, wherein the separation plate is angled relative to the top surface of the fluid of the tank.

16. The fluid storage tank of claim 15, wherein the separation plate has a thickness of between about 3 mm and 8 mm.

17. The fluid storage tank of claim 15, wherein the angle is between about 30 and 60 degrees.

18. The fluid storage tank of claim 17, wherein the angle is between about 40 and 50 degrees, and such that the slots are directed vertically downward in the direction of the fluid through there through.

19. The fluid storage tank of claim 15, wherein the angle is greater than 90 degrees.

20. A fluid storage tank comprising:

a housing defining an internal cavity, an inlet and an outlet; and an entrained air removal mechanism within the internal cavity fluidly interposed between the inlet and the outlet such that all fluid that passes through the inlet and outlet must pass through the entrained air removal mechanism;

wherein the entrained air removal mechanism is a separation plate within the housing separating the internal cavity into, at least, a first chamber and a second chamber, the plate including a plurality of slots there through that fluidly communicates the first chamber the second chamber; and wherein the slots are configured such that the fluid flow velocity through the slots between about 0.3 ft/sec and 9 ft/sec.

21. A fluid storage tank comprising:

a housing defining an internal cavity, an inlet and an outlet; and an entrained air removal mechanism within the internal cavity interposed between the inlet and the outlet such that all fluid that passes through the inlet and outlet must pass through the entrained air removal mechanism;

wherein the entrained air removal mechanism is a separation plate within the housing separating the internal cavity into, at least, a first chamber and a second chamber, the plate including a plurality of slots there through that fluidly communicates the first chamber with the second chamber;

wherein the plate is angled elative to the top surface of the fluid of the tank; and wherein the angle is between about 120 and 160 degrees, such that the fluid flow through the slots is directed to the top of the fluid storage tank.

22. A method of conditioning a hydraulic fluid including the steps of:

passing the hydraulic fluid through a fluid storage tank; and passing the fluid through an entrained air removal mechanism within the tank;

wherein the step of passing the fluid through an entrained air removal mechanism within the tank includes passing the fluid from a first chamber to a second chamber through a separation plate having a plurality of slots formed there through fluidly communicating the first and second chambers; and wherein the step of passing the fluid through an entrained air removal mechanism within the tank includes consolidating air bubbles entrained within the hydraulic fluid into larger bubbles while the fluid passes through the plurality of slots.

23. The method of claim 22, further including the steps of directing the fluid towards sidewalls of the tank to promote heat transfer between the hydraulic fluid and the sidewalls of the tank.

24. The method of claim 22, wherein the slots have a saw tooth profile and the faces of the teeth have a surface roughness of between about 40 Ra and 70 Ra.

25. The method of claim 24, wherein the step of directing the fluid includes separating the fluid into two separate flows as they pass through the separation plate, the separation plate having openings adjacent the sidewalls and a continuous section at the center of the plate between the slots adjacent the opposed sidewalls so as to prevent fluid flow through the center of the plate and force the fluid towards the sidewalls.

* * * * *

UNITED STATES PATENT AND TRADEMARK OFFICE

CERTIFICATE OF CORRECTION

PATENT NO. : 8,491,707 B2
APPLICATION NO. : 13/113661
DATED : July 23, 2013
INVENTOR(S) : Bruce E. Knuth It is certified that error appears in the above-identified patent and that said Letters Patent is hereby corrected as shown below:

In the Claims

In column 10, line 5, the line should be corrected to read -- cavity fluidly interposed between the inlet and the outlet such --.

In column 10, line 14, the line should be corrected to read -- wherein the separation plate is angled relative to the top surface of the --.

Signed and Sealed this
Twenty-fourth Day of September, 2013

Teresa Stanek Rea
*Deputy Director of the United States Patent and Trademark Office*